T. THOMAS.
Grain Drill.

No. 43,721.

Patented Aug. 2, 1864.

Witnesses:
Edw. P. Brown
J. B. Mollroff

Inventor:
Thomas Thomas

UNITED STATES PATENT OFFICE.

THOS. THOMAS, OF PLATTSMOUTH, NEBRASKA.

COMBINED SEEDER AND CULTIVATOR.

Specification forming part of Letters Patent No. 43,721, dated August 2, 1864.

*To all whom it may concern:*

Be it known that I, THOMAS THOMAS, of Plattsmouth, in the county of Cass, in the Territory of Nebraska, have invented a new and useful machine which is convertible into a corn-planter, a corn-cultivator, a wheat-drill and roller, and a broadcast-sower; and the following is a full, clear, and exact description of the same, reference being had to the accompanying drawings, making a part of this specification, in which—

Figure 1:
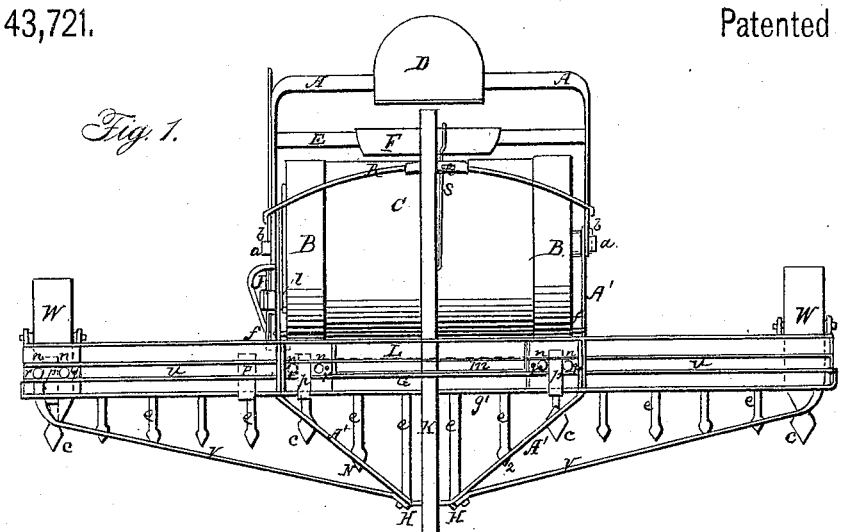
Figure 2:
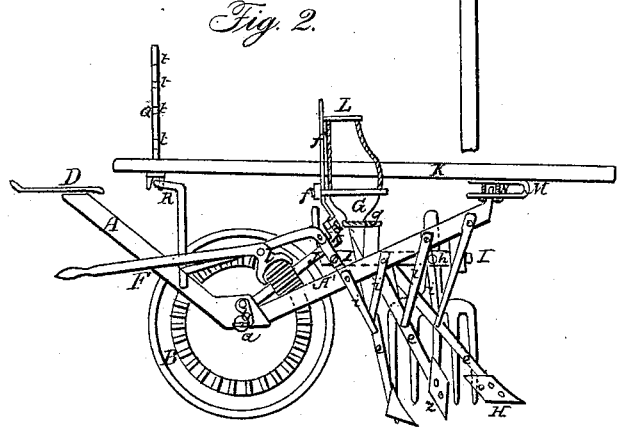
Figure 3:
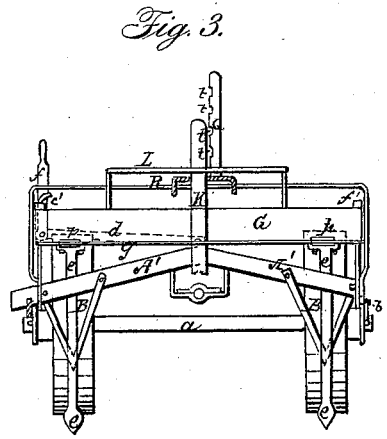
Figure 4:
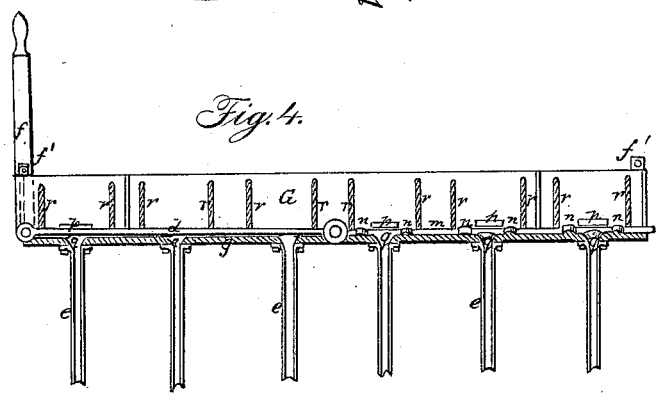
Figure 5:
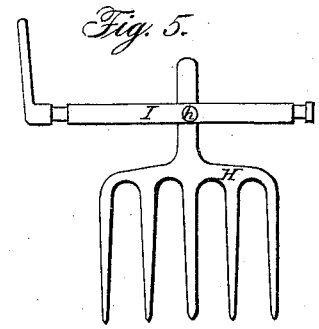

Figure 1 represents a plan or top view of the machine, with both of the extending-wings attached for broadcast sowing or for drilling in wheat twelve or sixteen feet in width or for planting four rows of corn. Fig. 2 shows a side view or elevation of the central part of the machine, with the plow-points adjusted for cultivating corn or other plants in rows or hills. Fig. 3 shows a front end view of the machine, the cylinder which forms the roller between the wheels being removed, and the central part being properly adjusted for planting two rows of corn or drilling in two rows of any kind of seed, the wheels covering the same. Fig. 4 represents a longitudinal section of the central part of the hopper or grain-receiver cut through the center, showing the vertical pins and holes in the slide and the mode of admitting the seed into the tubes for drilling in or scattering it broadcast when the tubes are removed. Fig. 5 shows a detached view of the rock-shaft and vibrating fork for cleaning out and straightening up young plants in cultivating.

The object of my invention is to furnish corn and wheat growers in prairie sections, and especially far west, with a universal convertible agricultural implement, one that can be so changed by putting on or taking off the several parts that it will serve the purpose of at least half a dozen distinct or separate implements or machines.

My invention consists in the construction and arrangement of the frame for attaching and mounting and so adjusting the several parts that it is easily convertible into a corn planter and cultivator or a wheat drill and roller, and also a broadcast-sower, (from eight to twenty-four feet spread,) as may be desired.

My invention also consists in the arrangment of the cross-bars over the slide in the hopper directly over the holes in the bottom, where the tubes are attached for planting corn or drilling in wheat, so that the quantity of seed to be deposited is regulated by changing the screw or pin which connects the coupling-rod to the crank, thereby giving it more or less range of vibration, as also the series of vertical pins contiguous to the holes in the slide to keep the grain stirred up, and the mode of attaching or coupling on to one or both sides of the machine an extended hopper and series of drills, or for sowing a wide range and operating the same by the one crank-connection; and, furthermore, the mode of adjusting the depth of the drills and guiding the side movement of the machine in cultivating corn or other plants (should the rows or hills be crooked or zigzag) by the tongue or pole extending back to the driver's seat and secured by a spring clamp or catch to a movable standard sliding on a rod in the arc of a circle, and likewise the changing of the position of the shovel points or blades on the tubes to effect the various purposes of agriculture for which they may be applied, and the vibrating fork for cleaning out and straightening up the plants.

To enable others skilled in the art to make, change, and use my invention, I will describe it more fully, referring to the drawings and the letters marked thereon.

The letters indicate the same parts in the several figures.

I make my frame A A of iron bars, bent round and secured together, and of such form as to conveniently attach the several parts in their proper places. At the lowest portion is secured the shaft $a$, on which the wheels B B are made to run. Between the wheels B B, which have each a circular recess around the rim near the periphery, is fitted a metallic cylinder, C, which forms a roller as wide as the central portion of the machine, to be used for the various purposes of rolling. The shaft $a a$ is secured to the frame by a pivoted hook, $b b$, entering a hole in the ends of the shaft, so that it can be easily taken out of its place, one of the wheels B taken off, and the drum or cylinder C removed, leaving nothing but the two wheels to press upon the soil when being used for a corn planter or cultivator. The portion of the frame A A that extends back of the roller is elevated at an angle of about thirty degrees. The top which extends across in the rear forms the support for the driver's seat D, and a brace-bar, E, extending across below, supports the foot-stool F. The forward portion of the frame A' A' is secured to the rear portion near the shaft a, and is inclined upward at an angle of about twenty degrees. This part of the frame supports the hopper or trough G, in which the grain is put to be planted or sown. To a cross-beam, g, which is firmly secured to the frame A' A', the tubes e e e e are fastened by screw-bolts, so that they can easily be put on for planting or drilling, and as easily taken off when the machine is used for broadcast-sowing. The tubes e e e e, which also form the stocks to secure the shovel-points c c c c to when the machine is used for cultivating, are supported by braces i i i i to the frame A' A'. The vibrating fork H is secured by a set-screw, h, so that its height may be adjusted by the shank fitting into a mortise through the rock-shaft I, and it is operated by the connecting-rod d being coupled to the crank k, the same being put in motion by the pinion l on the crank-shaft J, driven by a gear-wheel attached to the wheel B. More or less motion may be given to the fork H by the distance the connecting-rod d is attached from the center of the crank-shaft.

When the machine is used for planting in hills the dropping of the seed may be done at any desired distance apart by attaching the connecting-rod d to the hand-lever f, which may be placed either at the right or left hand end of the hopper G on the pin f', to be operated by the hand of the driver or a boy sitting on the elevated seat L over the center of the hopper, the one connecting-rod d serving the threefold purpose of dropping by hand, sowing in drills or broadcast, and vibrating the fork, and the motion in each operation regulated by the position in which the connecting-screw o is placed.

In the bottom of the hopper G is fitted a slide, m, it having a series of holes, n n n, through it, two of them being placed so as to alternately deposit the seed into one of the tubes e e by passing under a flat cross-bar, p, which should be about three times the width of the holes n n and placed directly over the holes in the frame g and the tubes e e e e, so that the slide in its vibrating motion takes the quantity of seed into the holes n n, carries it under the bar p, and liberates it through the orifice q. The vertical pins r r r r r in the slide m are for the purpose of keeping the seed loosely in the hopper. The tongue or pole K, to which the team is attached, is secured to the front end of the frame A' by a loop or strap, M, and bolt N, the loop forming the support for the double-tree to work in, the pole extending back over the hopper and roller, so as to be in a convenient position for the driver to control the action of the machine either up or down or sidewise. The depth of the drills or the cultivating-blades is determined and secured by the spring-catch s and the notches t t t t on the vertical rod Q, which is made and secured to a circular bar, R, in such manner as to allow the rear end of the pole K to be moved either right or left the whole width of the central part of the machine.

When desirable for planting more than two rows of corn, or drilling or sowing a wide land, wings with additional hoppers, U U, may be attached to the frame or central bar, g, the ends being supported on additional wheels, W W, and the wings supported by forward braces, V V, bolted to the center of the frame A'.

The plow-points directly in front of the wheels serve to level the way for the implement to run smoothly. In cultivating corn the two plow-points X X in the center are placed to clean the extraneous matter away from the plants. The next two points, Z Z, are reversed and cut a little deeper and throw the soil inward toward the plants, while the fork, being in motion, uncovers or draws out the leaves.

Thus it will be seen that a machine constructed as above described can readily be changed or converted into all of the implements necessary for planting and cultivating corn, drilling in or broadcast-sowing wheat or other grain or seed, rolling and leveling the surface, it being a universal agricultural implement for grain-growers.

Having thus fully described my invention, what I claim as new, and desire to secure by Letters Patent, is—

1. The construction and arrangement of the frame and the mode of attaching and detaching the several parts so that it is convertible into a corn planter and cultivator, a wheat-drill and roller, or a broadcast-sower.

2. The cross-bar p p in the hopper over the holes in the bottom of the same, in combination with the holes n n and the vertical pins r r in the slide, and the manner of regulating the quantity of seed to be sown by changing the crank screw or pin o, in the manner herein described.

3. The vibrating fork H, arranged and operating in the manner as and for the purposes herein set forth.

4. The mode of attaching the draft-pole to the machine so that the depth of planting or drilling in the seed and the position sidewise may be controlled by the driver in his seat.

THOMAS THOMAS.

Witnesses:
 EDM. F. BROWN,
 J. B. WOODRUFF.